United States Patent [19]

Horiuchi et al.

[11] Patent Number: 5,100,168

[45] Date of Patent: Mar. 31, 1992

[54] AIR BAG FOR VEHICLES

[75] Inventors: Noriyuki Horiuchi; Hiroyuki Kobayashi, both of Ichinomiya; Kenji Yano, Inazawa; Shinichi Saito, Aichi; Masahiko Ozeki, Gifu, all of Japan

[73] Assignee: Toyoda Gosei Co., Ltd., Nishikasugai, Japan

[21] Appl. No.: 680,897

[22] Filed: Apr. 5, 1991

[30] Foreign Application Priority Data

Apr. 6, 1990 [JP] Japan ................................. 2-092745
Oct. 31, 1990 [JP] Japan ................................. 2-296290

[51] Int. Cl.$^5$ ............................................. B60R 21/16
[52] U.S. Cl. ....................................... 280/728; 280/743
[58] Field of Search ........................ 280/728, 729, 743

[56] References Cited

U.S. PATENT DOCUMENTS 3,879,057  4/1975  Kawashima et al. ................ 280/743

FOREIGN PATENT DOCUMENTS 2-133268  5/1990  Japan ................................. 280/728
2-175352  7/1990  Japan ................................. 280/728

*Primary Examiner*—David H. Bollinger
*Attorney, Agent, or Firm*—Cushman, Darby & Cushman

[57] ABSTRACT

An air bag for vehicles is formed by a pair of sheets of composite materials for bags sewed together with a sewing thread at their peripheral portions which are inside the bag. A sewing thread protecting layer made of a rubber compound covers the exposed portions of the thread. Each of the sheets consists of a base fabric for bags and a heat-resistant film of a chloroprene rubber compound laminated on the inside surface of the base fabric. The sewing thread protecting layer is made of a rubber compound containing a blend polymer of ethylene propylene rubber and choroprene rubber with the blending formula by weight of the former and the latter being from 30/70 to 70/30.

3 Claims, 3 Drawing Sheets

AIR BAG FOR VEHICLES

BACKGROUND OF THE INVENTION

1. Field of the Invention

The present invention relates to an air bag, which is used in an air bag device to located in vehicles to protect the driver and/or passengers in the event of a collision. An air bag for vehicles (hereinafter simply referred to as an "air bag") is instantaneously inflated, when triggered for operation, by quick injection of an expansive gas from an inflator, thus protecting the driver and/or passengers.

2. Description of the Prior Art

A conventional air bag 1 is shown in FIGS. 1 to 3.

Abbreviations for polymers and plasticizers referred to hereinafter are as follows:

CR : Chloroprene Rubber
IIR : Butyl Rubber
EPR : Ethylene Propylene Rubber
EPDM : Ethylene Propylene Non-conjugated Diene Terpolymers
EPM : Ethylene Propylene Copolymer
DOS : Di(2-ethylhexyl) Sebacate Unless otherwise specifically indicated, compounding unit is weight.

The air bag 1 is in a bag shape. It is formed by sewing together, with a sewing thread 6, the peripheral portions of two sheets 4 and 5 of composite materials, as shown in FIG. 1. Each of the sheets 4 and 5 is composed of a base fabric 2 having laminated on one side thereof a heat-resistant film 3 made of a CR compound. When the two sheets 4 and 5 are sewed together into a bag, the peripheral portions of the sheets and the heat-resistant film 3 are located inside the bag with the fabric on the outside.

The outer peripheral portion of the film 3 has a protective layer 8 thereon to cover the sewed areas of the sheets 4 and 5, i.e. to cover the exposed portions of the thread 6 and protect them from the heat of an expansive gas which has high temperature initially when it is injected into the air bag 1.

That sheet of the air bag 1, e.g. sheet 4, opposite the sheet facing a person is provided with a central inflator-mounting hole 9. A reinforcing composite substrate 12, unually annular, is sewed inside the bag on the sheet 4 around the inflator-mounting hole 9. the substrate 12 has the same composition as that of the sheets 4 and 5, i.e. having a reinforcing base fabric 10 having laminated on one side thereof a heat-resistant film 11 made of a CR compound. the film 11 faces the interior of the bag 1. The inside area 13 where the substrate 12 and the sheet 4 are sewed together is covered with a protecting layer 14, like layer 8, to protect the exposed portions of the sewing thread 6 attaching the substrate 12 to the sheet 4, from the heat of the expansive gas.

Additionally, reinforcing composite substrates 12 inside the bag 1 are sewed onto the sheet 4 about the periphery of gas exhaust holes 15 in the sheet 4. Those sewed areas are also covered with layers 17 to protect the threads from expansive gas heat.

Through holes 18 are provided in the sheet 4, substrate 12 and layer 14 for bolts and rivets (not shown) to mount the inflator I on the sheet 4.

Conventionally, the sewing thread protecting layers 8, 14 and 17 are generally made of a silicone rubber compound (Refer to Japanese Utility Model Laid-Open Publication No. Sho. 61-85549). Specifically, a silicone rubber tape or silicone rubber glue is applied on the sewed areas to form the thread-protecting layers. A silicone rubber compound is used to make the layers is because it is excellent in both heat resistance and cold-crack resistance.

However, a thread-protecting layer of a silicone rubber compound does not have good adhesion with a heat-resistant film made of a CR rubber compound.

A suggestion may be made to form the thread-protecting layer with a CR rubber compound similar to that of the heat-resistant film, but that would result in problems.

In the first place, it is necessary to make the protecting layer thicker than the heat-resistant film because the protecting layer must not only shield the sewing thread but also smooth out the rough surface of the heat-resistant film caused by the sewing thread. Thus, the thickness of the protecting layer is gernerally from 0.2 to 2 mm and the heat-resistant layer from 0.02 to 0.15 mm.

However, when the thicker protecting layer is formed with a CR compound, its inferior cold-crack resistance performance versus that of silicone rubber is immediately evident.

Hence, it has been known to those skilled in the art that CR is undesirable as a material for the thread-protecting layer.

For installing the air bag 1 in a car, it is folded into a small and compact form and then installed in an air bag device. When folded into a small and compact form, the peripheral por of the sheets 4 and 5 are folded many more times than the areas of sheet 4 in proximity to the inflator-mounting hole 9 and the areas of the sheet 5 opposite that hole. Therefore, the material chosen for the protecting layer 8 on peripheral portions of the sheets 4 and 5 is influenced by the cold-crack resistance factor.

SUMMARY OF THE INVENTION

An object of the present invention is to provide an air bag with an inside lamination of film of a CR compound and also a sewing thread protective layer that not only has good adhesion to that film but also has good cold-crack resistance.

During extensive researches and studies of the above problems, it was found that a sewing thread protective layer made of a rubber compound based on special blend polymer meets that object.

The first embodiment of the present invention is an air bag for vehicles, which has a pair of sheets of composite materials for bags sewed together, witgh a sewing thread, at the peripheral portions thereof into a bag, the sheets comprising a base fabric for bags with a CR compound hear-resistant film laminated on the inner side of the fabric, and a sewing thread protecting layer made of a rubber compound applied over the areas where the sewing thread is exposed, the layer being made of a blend polymer of EPR and CR with the blending formula by weight of the former and the latter being from 30/70–70/30.

The second embodiment of the present invention is the same as the first but one of the sheets has a hole therein for mounting an inflator to the bag, a reinforcing composite substrate having the same composition as the sheets is sewed with a sewing thread on the inner surface of the one sheet about the inflator-mounting hole, and a sewing thread protective layer applied over the area of the substrate where the thread is exposed, the layer being made of a blend of EPR and CR with the blending formula by weight of the former and the latter being from 30/70-70/30.

The second embodiment of the present invention also has good adhesion of the protective layer to the heat-resistant film of the substrate, and provides a good cold-crack-resistant surface around the inflator mounting area.

DESCRIPTION OF THE PREFERRED EMBODIMENT

Figure 1:
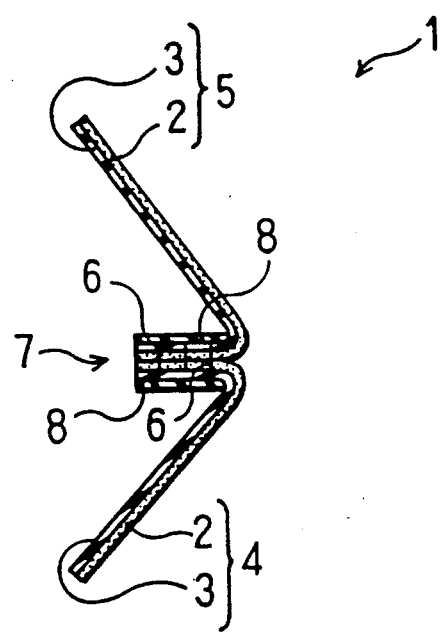
FIG. 1 is an enlarged fragmentary view of the section A shown in FIG. 3 (a cross section of the sewed peripheral portions of the sheets forming the bag).

1. The first embodiment of an air bag of the present invention is made of a pair of sheets 4 and 5 of composite materials for bags, sewed together at their peripheral portions to form a bag (see FIGS. 1 and 3). Each of the sheets 4 and 5 is composed of a base fabric 2 for bags and a heat-resistant film 3, made of a CR compound, laminated on the inner surface of the fabric.

2. The sewed areas 7 of the sheets 4 and 5 are coated with a sewing thread protecting layer 8.

Figure 2:
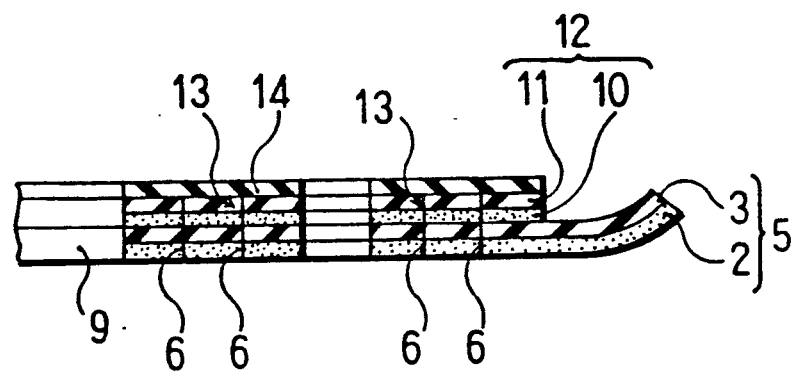
FIG. 2 is an enlarged fragmentary view of the section B shown in FIG. 3 (a cross section of the sewed portion of the bag about the inflator-mounting hole).
Figure 3:
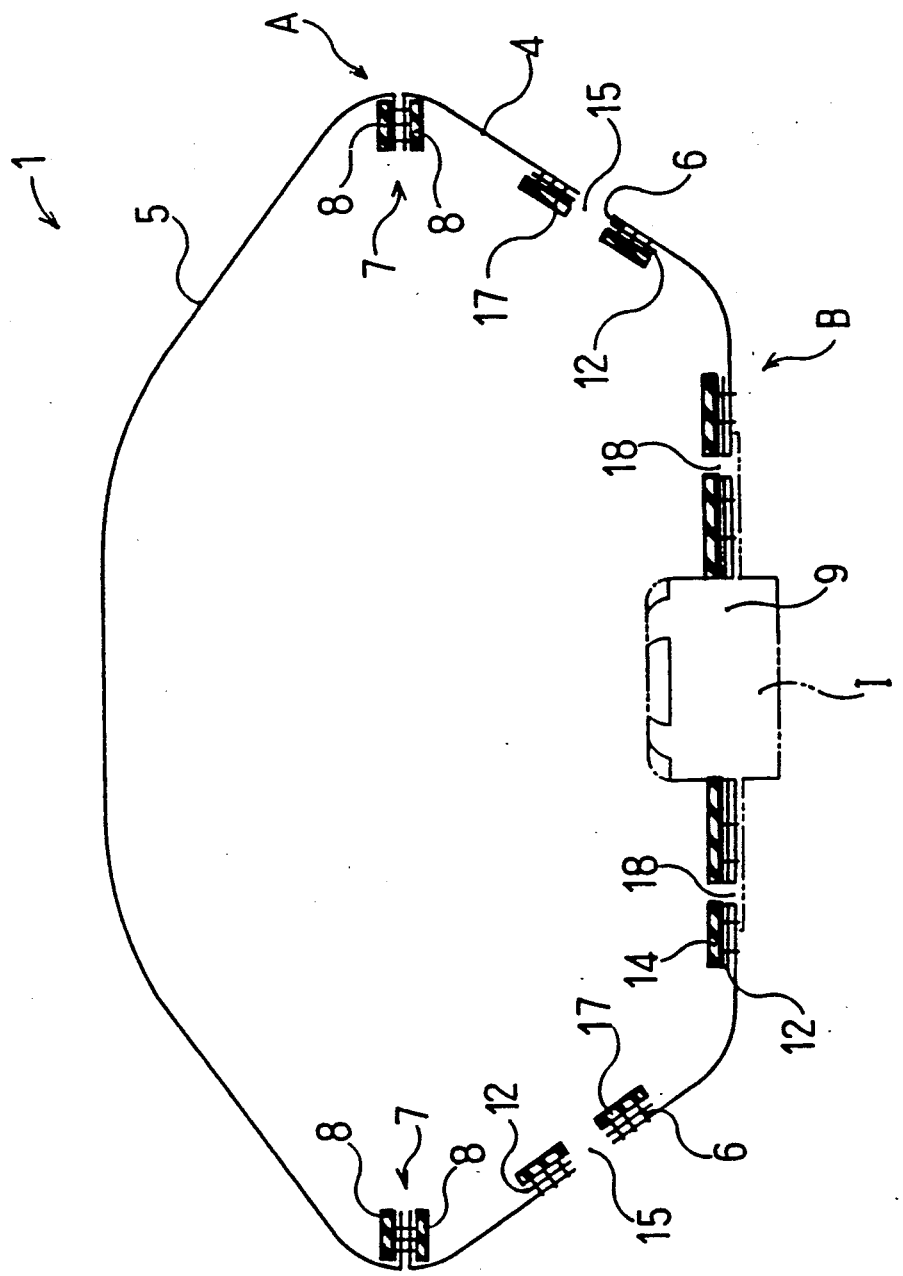
FIG. 3 is a schematic sectional view of an inflated air bag embodying this invention.

The second embodiment of an air bag of the present invention is like the first but has a reinforcing composite substrate 12, which is sewed on the inner surface of the air bag sheet 4 about the periphery of an inflator-mounting hole 9 (see FIGS. 2 and 3). The reinforcing composite substrate 12 is composed of a reinforcing base fabric 10 and a heat-resistant film 11 made of a CR compound, laminated on the inner surface of the fabric 10. The sewed area 13 of the reinforcing composite substrate 12 is covered with a sewing thread protecting layer 14.

(1) The rubber material (polymer) for the CR compound is not limited to only CR but may include blend polymers comprising CR and other polymers such as IIR, chlorinated IIR, brominated IIR or the like. The CR content must be 70% or more.

CR may be sulfur-modified type. However, CR should preferably be a non-sulfur-modified type considering the heat-resistance factor.

(2) The CR compound should contain general auxiliary materials such as carbon black, zinc flower, a process oil, processing auxiliary agents, a vulcanizing agent, vulcanizing accelerators and others.

(3) Each of the sheets 4 and 5 and the reinforcing composite substrate 12 is composed of a base fabric 2 for bags and a reinforcing base fabric 10 respectively, and a heat-resistant film 3 and 11 made of said rubber compound is laminated on one surface (inner surface) of the base fabric 2 for bags or reinforcing fabric 10, respectively. The base fabric 2 for bags and the reinforcing base fabric 10 are made of a woven fabric of nylon or polyester yarns. Lamination of the heat-resistant film 3 and 11 is effected by friction or a topping process. Each of the bag sheets 4 and 5 and the reinforcing composite substrate 12 is cut into a desirable size (generally a circular form for the bag composite materials and a ring form for the reinforcing composite substrate) for the laminating process. The bag base fabric 2 and the reinforcing base fabric 10 shall have a count of 50 yarns per inch with 300 d yarn and 20 yarns per inch with 1000 d yarn, respectively. The thickness of the heat-resistant film 3 shall be within the range of 0.02 to 0.15 mm.

2. In the first embodiment of an air bag of the present invention, the sewing thread protecting layer covering the sewed peripheral portions of the air bag sheet 4 and 5 is made of a rubber compound prepared from a certain blend polymer. The blend polymer consists of EPR and CR by weight ratio of 30/70 to 70/30.

(1) The EPR used here shall mean a binary copolymer (EPM) of ethylene and an alpha-olefin and a sulfur-vulcanizable ternary copolymer (EPDM) prepared by copolymerization of ethylene and an alpha-olefin along with a slight amount of a non-conjugated diene.

(2) As for CR, said materials are usable. More specifically, it is suggested to use middle-crystalline materials for optimum balance of the heat resistance and the cold-crack resistance factors.

(3) In blending EPR and DR, if the former is too much, adhesion to the heat-resistant film will become poor. On the contrary, if the former is too little, cold-crack resistance problems tend to occur.

(4) The above-mentioned rubber compound shall be prepared by adding carbon black, zinc flower, process oil, vulcanizing agent, vulcanizing accelerator and other auxiliary materials like in the case of preparing the CR compound for forming the heat-resistant film. For co-vulcanizing CR and EPR, sulfur and metal oxide are used as vulcanizing agents when EPR is EPDM. On the other hand, when EPR is EPM, organic peroxide and metal oxide are used as vulcanizing agents.

(5) For forming said sewing thread protecting layer 8, a tape-like layer may be stuck to the sewed area 7 or, alternatively, latex state material may be coated over the area 7. Thereafter the stuck layer or coated material is vulcanized to form the layer. Recommended vulcanization condition is 170° C. × 10 minutes.

3. In the second embodiment of an air bag of the present invention, the sewing thread protecting layer 14 applied over the second peripheral portion of the inflator-mounting hole 9 is made of a rubber compound prepared from a certain blend polymer. The blend polymer consists of EPR and CR by weight ratio of 10/90 to 70/30.

(1) For EPR and CR, the compositions defined in paragraphs 2. (1) (2) above are applicable here.

(2) In blending EPR and CR, if the former is too much, the adhesion to the heat-resistant film will become poor. On the contrary, if the former is too little, cold-crack resistance problems tend to occur. However, the folding complexity to install the big bag in the air bag system is less for the protecting layer over the sewed peripheral of the portions sheets 4 and 5, than for the protective layer about the periphery of the inflator-mounting hole 9. Therefore, there is no problem even if the content of EPR in the blend polymer for the protecting layer 14 may be less than that for the protecting layer 8.

(3) Same description as in paragraph 2. (4) above is applicable to the rubber compound prepared from said blend polymer.

(4) To form the sewing thread protecting layer 14, a tape-like layer is stuck over the sewed area 13 or, alternatively, latex state material is brush- or spray-coated over the area 13. Thereafter the stuck layer or coated material is vulcanized to form the layer. Recommended vulcanization condition is 170° C. ×10 minutes.

(5) In forming the protecting layer 14, the layer does not need to be applied over the entire surface of the reinforcing composite substrate 12. It is good enough to apply it only over the exposed portions of the sewing thread 6.

(6) Explanations have been made above for the sewing thread protecting layers 8 and 14 which are to cover the sewed areas at the peripheral portions of the sheets and to cover the peripheral portion about the inflator-mounting hole. For the sewing thread protecting layer 17 about the periphery of the exhaust holes 15, the blending formula for sewing the thread protective layers 8 and 14 shall be the base with proper modification within the allowed ranges.

In order to identify the effect of the present invention, various comparisons were made by tests and the results listed in Table 1 below.

First, test pieces were prepared and tested for cold-crack resistance (low temperature twist test: JIS K 6301). Details of the test pieces are shown in Table 1 below.

Tapes (15×1 mm-thick) were prepared from the materials indicated in Table 1, for forming the sewing thread protecting layers 8 and 14 for the air bag 1 as detailed in FIGS. 1 to 3. Each of the tapes was adhered by vulcanization to the sheet 4 and the reinforcing composite substrate 12 of the air bag. Then the air bag was tested with respect to the following test items.

The heat-resistant films 3 and 11 of the air bag were formed from the CR compound according to the blending formula indicated in Table 2. For the air bag base fabric 2 and the reinforcing base fabric 10, a nylon yarn-woven fabric (thickness of yarn: 840 d, count: 25 yarns/in.) was used. The thickness of the heat-resistant films 3 and 11 was 0.05 mm. The films were laminated on the respective nylon-woven fabrics by friction.

[1] Test of the adhesion strength of the sewing thread protecting layers 8 and 14 to the heat-resistant film:
In the test, 180°-peeling strength was measured.

[2] Test of the adhesion strength of the sewing thread protecting layers 8 and 14 and the appearance after the inflation of the air bag in an actual car.

The test was conducted in the following way for adhesion strength and appearance of the tapes:
(1) Adhesion:
Visually checked and evaluated as follows:
Peeled: The tape peeled off and the sewed thread was exposed.
Nearly Good: The tape partly peeled off but the sewed thread was not exposed.
Good: The tape did not peel off at all.
(2) Appearance of the Tape:
Visually checked cracks of the tested tape.

The air bag was folded, as described below, to be installed in an air bag device and then installed in an actual car. (Refer to FIG. 4.)

Figure 4:
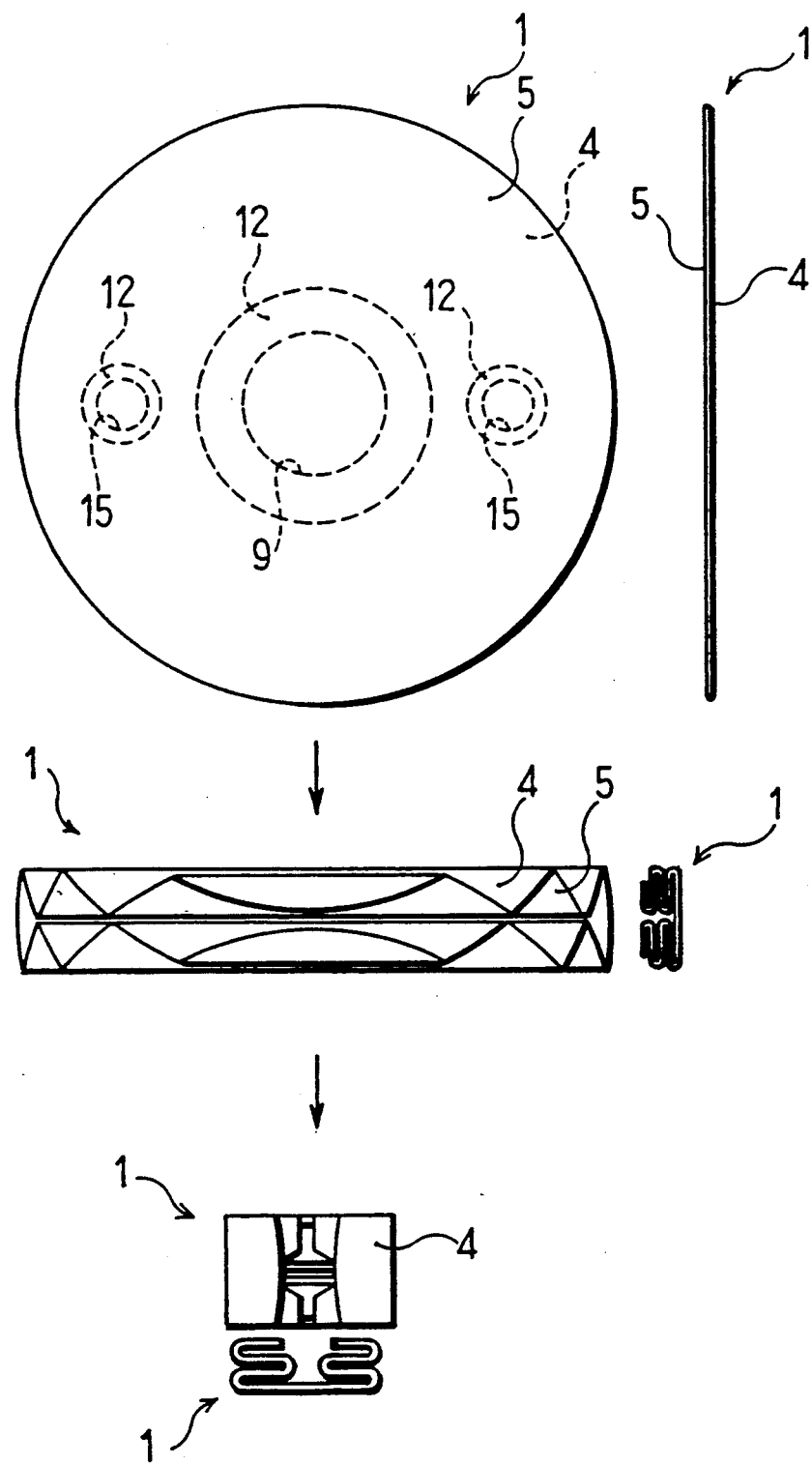
FIG. 4 comprises successive diagrams illustrating how the air bag of FIG. 3 is folded to fit into an air bag device.

As shown in the right hand view at the top of FIG. 4, the air bag was first flatted in such a way that the inner surface of the sheet 5 is against the inner surface of the sheet 4.

Then, corrugate-fold the upper half and the lower half, i.e. sheets 4 and 5, of the flatted air bag, as shown in the middle views of FIG. 4.

Afterwards, corrugate-fold right half and left half, so that the air bag is now rectangular, seen from the top and shown in the lowermost views in FIG. 4.

While folding the air bag, the reinforcing composite substrate 12 around the inflator-mounting hole 9 is folded once to each of the left and right peripheries and the upper and lower peripheries, and the periphery of the folded substrate 12 becomes a rectangular shape.

The test was conducted on actual cars with the air bags folded that way. The test results indicated that the sample from example 2 of the invention was suitable for the sewing thread protecting layer 8, and the samples from example 2, and 3 of the invention were suitable for the sewing thread protecting layer 14.

TABLE 1

| | Comparative Example 1 | Examples of the Invention | | | Comparative Example 2 | Example of Prior Art 1 |
| --- | --- | --- | --- | --- | --- | --- |
| | | 1 | 2 | 3 | | |
| EPDM (*1) | 100 | 75 | 50 | 25 | 0 | RTV Silicone Rubber (commercial product) |
| CR (non-sulfur-modified) (*2) | 0 | 25 | 50 | 75 | 100 | |
| MAF Carbon Black | 20 | 20 | 20 | 20 | 20 | |
| DOZ (plasticizer) | 20 | 20 | 20 | 20 | 20 | |
| Zinc Flower | 5 | 5 | 5 | 5 | 5 | |
| Stearic Acid | 1 | 1 | 1 | 1 | 1 | |
| Sulfur + MgO | 5.5 | 5.5 | 5.5 | 5.5 | 5.5 | |
| Vulcanizing Accelerator | 4.6 | 4.6 | 4.6 | 4.6 | 4.6 | |
| Cold-crack Resistance (JIS K 6315) Low-temperature Twist Test | | | | | | |
| T2 (°C.) | −52 | −50 | −49 | −47 | −44 | −47 |
| T5 (°C.) | −57 | −55 | −53 | −51 | −48 | not more than −60 |
| T10 (°C.) | −59 | −57 | −56 | −53 | −50 | not more than −60 |
| T100 (°C.) | not more than −60 | not more than −60 | not more than −60 | −59 | −55 | not more than −60 |
| Adhesion Power to Heat-resistant Film (kgf/in) After Inflation | 0.5 | 0.9 | 1.8 | 2.9 | 5.1 | 0.8 |
| Sewing Thread-Protecting Layer (8) | | | | | | |
| −40° C. × 4 H  Adhesiveness | Peeled | Nearly Good | Good | Good | Good | Peeled |
| Outward Appearance | No problem | No Problem | No Problem | Some Cracked | Cracked | No Problem |

TABLE 1-continued

| | | Comparative Example 1 | Examples of the Invention 1 | 2 | 3 | Comparative Example 2 | Example of Prior Art 1 |
|---|---|---|---|---|---|---|---|
| 90° C. × 4 H | of Tape Adhesiveness | Peeled | Nearly Good | Good | Good | Good | Peeled |
| | Outward Appearance of Tape | No Problem | No Problem | No Problem | No Problem | No Problem | No Problem |
| Sewing Thread-Protecting Layer (14) | | | | | | | |
| −40° C. × 4 H | Adhesiveness | Peeled | Nearly Good | Good | Good | Good | Peeled |
| | Outward Appearance of Tape | No Problem | No Problem | No Problem | No Problem | Some Cracked | No Problem |
| 90° C. × 4 H | Adhesiveness | Peeled | Nearly Good | Good | Good | Good | Peeled |
| | Outward Appearance of Table | No Problem | No Problem | No Problem | No Problem | No Problem | No Problem |

(*1) JSR EP33, product by Nippon Synthetic Rubber Co.;
(*2) Denka Chloroprene S-40V, product by Denki Kagaku Kogyo KK

TABLE 2

| | |
|---|---|
| CR (*1) | 90 |
| Chlorinated IIR (*2) | 10 |
| Magnesium Oxide | 3.7 |
| Stearic Acid | 1 |
| MAF Black | 20 |
| Zinc Oxide | 5 |
| Vulcanizing Accelerator | 1 |
| Anti-aging Agent | 6 |
| Plasticizer | 20 |
| Flame-Retardant | 30 |

(*1) Denka Chloroprene S-40V (Product by Denki Kagaku Kogyo K.K.)
(*2) Esso Butyl HT-1068 (Product by Exon Chemical Co.)

While the invention has been described in detail and with reference to specific embodiments thereof, it will be apparent to one skilled in the art that various changes and modifications can be made therein without departing from the spirit and scope of the following claims.

What is claimed is:

1. An air bag for vehicles comprising:
a pair of sheets sewed together with a sewing thread at their peripheral portions to form a bag, said sheets each comprising a base fabric for bags and a heat-resistant film of a chloroprene rubber compound laminated on one side of said base fabric, said peripheral portions and said film being inside said bag, and a sewing thread protecting layer made of a rubber compound and covering the exposed portions of the threads, wherein the rubber compound of said layer comprises a blend polymer of ethylene propylene rubber and chloroprene rubber with the blending formula by weight of the former and the latter being from 30/70 to 70/30.

2. An air bag for vehicles comprising:
a pair of sheets for air bags secured together into a bag shape, one of said sheets having a hole therein for mounting an inflator thereon;
a reinforcing composite substrate sewed with a sewing thread on the inner surface of said one sheet about the periphery of said inflator-mounting hole, said substrate comprising a reinforcing base fabric and a heat-resistant film of a chloroprene rubber compound laminated on that surface of said fabric facing the interior of the bag; and
a sewing thread protecting layer made of a rubber compound covering the exposed portions of said thread inside the bag, said layer being made of a rubber compound containing a blend polymer of ethylene propylene rubber and chloroprene rubber with the blending formula by weight of the former and the latter being from 10/90 to 70/30.

3. An air bag for vehicles comprising:
a pair of sheets sewed together with a sewing thread at the peripheral portions thereof to form a bag, one of said sheets having a hole therein for mounting an inflator to said bag, said sheets being made of a base fabric for bags and a heat-resistant film of a chloroprene rubber compound laminated on one side of the said base fabric, said peripheral portions and said film being inside said bag;
a first sewing thread protecting layer made of a rubber compound covering the exposed portions of said sewing thread, said first layer consisting of a rubber compound containing a blend polymer of ethylene propylene rubber and chloroprene rubber with the blending formula by weight of the former and the latter being from 30/70 to 70/30;
a reinforcing composite substrate sewed with a sewing thread on the inner surface of said one sheet about the periphery of said inflator-mounting hole, said substrate comprising a reinforcing base fabric and a heat-resistant film of a chloroprene rubber compound laminated on that surface of said reinforcing base fabric facing the interior of said bag;
a second sewing thread protecting layer made of a rubber compound and covering the exposed portions of said thread sewing said substrate to said one sheet, said second layer comprising a rubber compound containing a blend polymer of ethylene propylene rubber and chloroprene rubber with blending formula by weight of the former and the latter being from 10/30 to 70/30.

* * * * *